(12) United States Patent
Kim

(10) Patent No.: US 12,447,811 B2
(45) Date of Patent: Oct. 21, 2025

(54) MOUNT BUSH

(71) Applicants: Hyundai Motor Company, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 306 days.

(21) Appl. No.: 18/241,584

(22) Filed: Sep. 1, 2023

(65) Prior Publication Data

US 2024/0326573 A1   Oct. 3, 2024

(30) Foreign Application Priority Data

Apr. 3, 2023 (KR) ........................ 10-2023-0043397

(51) Int. Cl.
*B60K 5/12* (2006.01)
*F16F 1/38* (2006.01)

(52) U.S. Cl.
CPC .......... *B60K 5/1225* (2013.01); *F16F 1/3842* (2013.01)

(58) Field of Classification Search
CPC ...... B60K 5/1225; B60K 5/1208; B60K 5/12; F16F 1/3842; F16F 1/38; F16F 1/3863; F16F 9/46; F16F 13/14
See application file for complete search history.

(56) References Cited

U.S. PATENT DOCUMENTS

| | | | | |
|---|---|---|---|---|
| 5,558,316 A * | 9/1996 | Lee | ......................... | F16F 13/14 267/219 |
| 6,299,148 B1 * | 10/2001 | Miyamoto | ............... | F16F 13/14 267/293 |
| 8,839,900 B2 * | 9/2014 | Kim | ......................... | B60K 5/00 180/312 |
| 11,781,613 B2 * | 10/2023 | Kim | .................... | F16F 13/1463 267/140.11 |
| 12,370,878 B2 * | 7/2025 | Hirano | .................. | B60K 5/1283 |
| 2023/0173906 A1 | 6/2023 | Kim | | |

FOREIGN PATENT DOCUMENTS

| | | | | |
|---|---|---|---|---|
| DE | 102020133541 A1 * | 1/2022 | .......... | F16F 13/1418 |
| KR | 2022-0125433 A | 9/2022 | | |
| KR | 2023-0084761 A | 6/2023 | | |

* cited by examiner

*Primary Examiner* — John D Walters
(74) *Attorney, Agent, or Firm* — MORGAN, LEWIS & BOCKIUS LLP

(57) ABSTRACT

A mount bush includes an internal pipe, a middle pipe disposed outside the internal pipe, a main rubber vulcanized between the internal pipe and the middle pipe, and an external pipe fitted onto an external side of the main rubber, wherein the middle pipe is configured to be variable in length thereof.

19 Claims, 14 Drawing Sheets

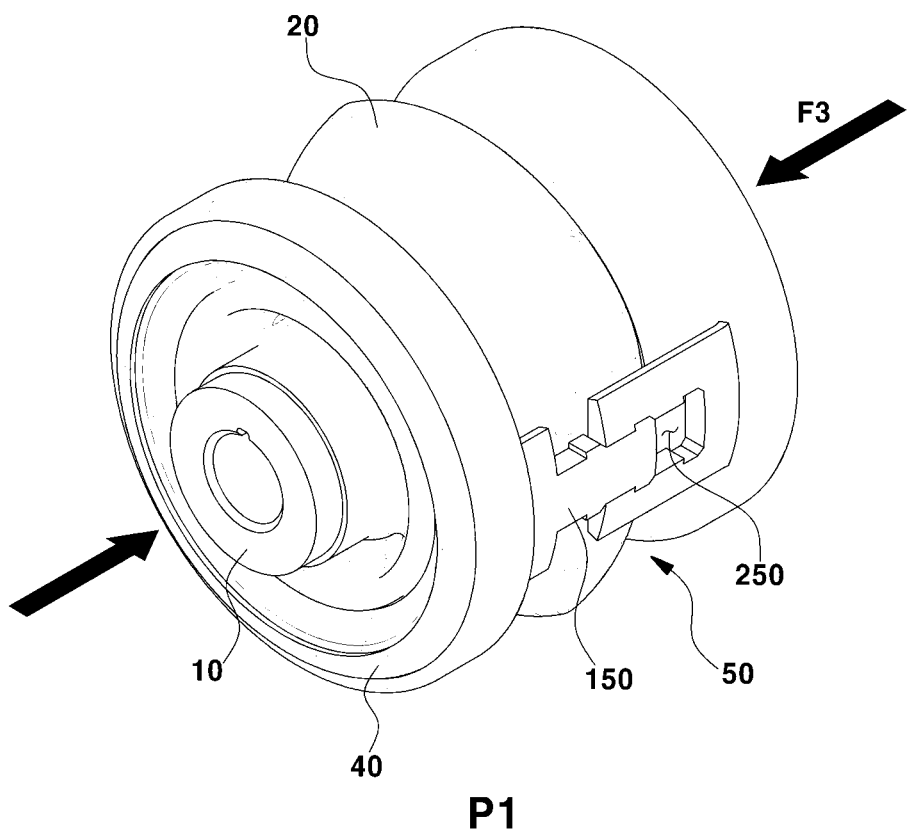

P2

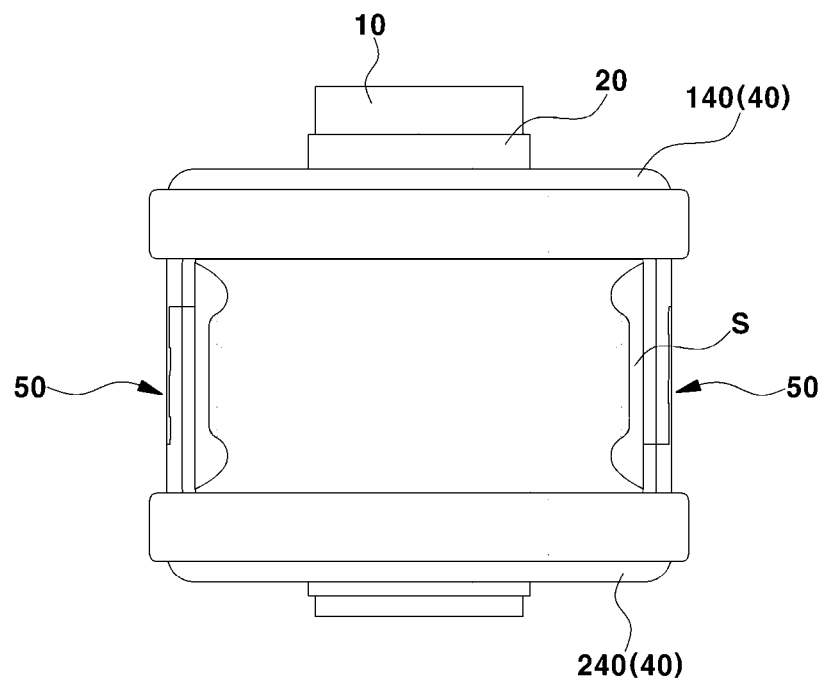

MOUNT BUSH

CROSS-REFERENCE TO RELATED APPLICATION

The present application claims priority to Korean Patent Application No. 10-2023-0043397, filed on Apr. 3, 2023, the entire contents of which is incorporated herein for all purposes by this reference.

BACKGROUND OF THE PRESENT DISCLOSURE

Field of the Present Disclosure

The present disclosure relates to a mount bush.

Description of Related Art

Recently, research and development on an electric vehicle, which is an eco-friendly vehicle, is being actively conducted. An electric vehicle is powered by a motor instead of a conventional engine and is powered by a rechargeable battery rather than petroleum fuel.

An electric vehicle includes a motor that generates driving power and a power electronics (PE) module that supplies power to the motor. The motor and the PE module may be mounted in a vehicle using a bush mount for load support, vibration and noise absorption, and behavior control.

A bush-type mount includes a main rubber (made of rubber) cured on an internal pipe. An external pipe is press-fitted to an external side of the main rubber, and the external pipe is swaged. Additionally, there are many cases in which a middle pipe is located between the internal pipe and the external pipe for tuning the bush.

The middle pipe provides an advantage of adjusting a three-way characteristic ratio and improving high-frequency dynamic characteristics. However, there is a problem in that the durability of the bush is reduced when the middle pipe is adopted.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mount bush configured for increasing the durability of a mount.

The object of the present disclosure is not limited to the above-mentioned object, and other objects not mentioned herein will be clearly understood by those of ordinary skill in the art to which an exemplary embodiment of the present disclosure pertains (hereinafter, "those skilled in the art") based on the description below.

Various aspects of the present disclosure are directed to providing a mount bush including an internal pipe, a middle pipe disposed outside the internal pipe, a main rubber vulcanized between the internal pipe and the middle pipe, and an external pipe fitted onto an external side of the main rubber. Here, the middle pipe may be variable in length thereof.

Various aspects of the present disclosure are directed to providing a method of manufacturing a mount bush, the method including assembling a middle pipe including a first middle pipe and a second middle pipe into a first position, disposing an internal pipe inside the middle pipe, vulcanizing a main rubber between the internal pipe and the middle pipe, and applying an axial force on the middle pipe where the main rubber is cured to move the same to a second position.

Other aspects and exemplary embodiments of the present disclosure are discussed infra.

It is to be understood that the term "vehicle" or "vehicular" or other similar terms as used herein are inclusive of motor vehicles in general, such as passenger vehicles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

BRIEF DESCRIPTION OF THE DRAWINGS

FIG. 7A and FIG. 7B illustrate an assembly process of a mount bush including a middle pipe according to an exemplary embodiment of the present disclosure;

FIG. 10 illustrates a state in which a middle pipe of a mount bush according to an exemplary embodiment of the present disclosure is in a second position:

Figure 1:
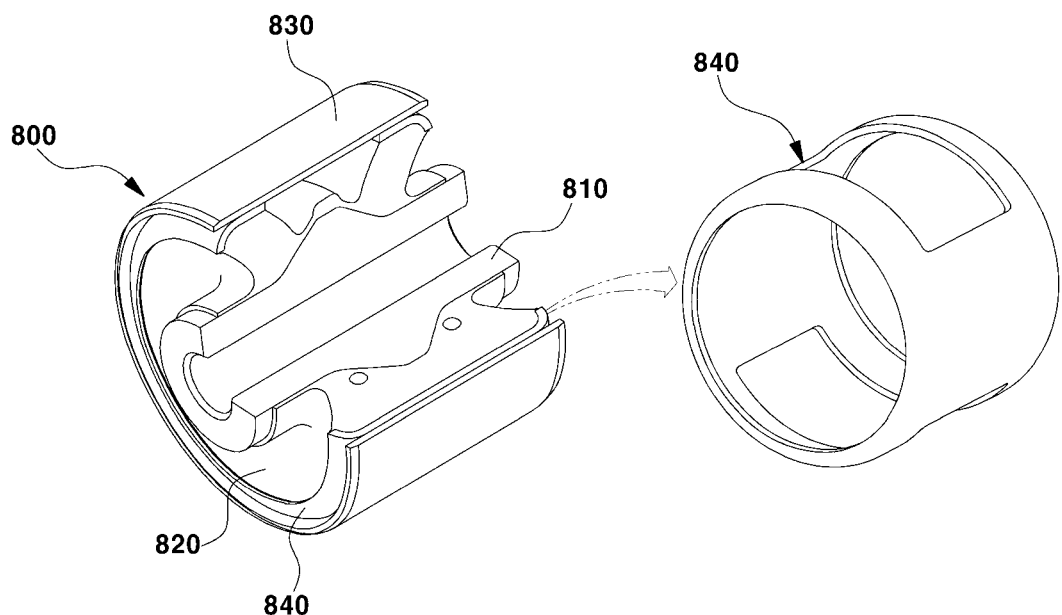
FIG. 1 illustrates an exemplary mount bush.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes, will be determined in part by the particular intended application and usage environment.

In the figures, the reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Descriptions of specific structures or functions presented in the exemplary embodiments of the present disclosure are merely exemplary for explaining the exemplary embodiments according to the concept of the present disclosure, and the exemplary embodiments according to the concept of the present disclosure may be implemented in various forms. Furthermore, the descriptions should not be construed as being limited to the exemplary embodiments described herein, and should be understood to include all modifications, equivalents and substitutes falling within the idea and scope of the present disclosure.

Meanwhile, in an exemplary embodiment of the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for illustrating embodiments and is not intended to limit the present disclosure. In the present specification, the singular form includes the plural sense, unless specified otherwise. The terms "comprises" and/or "comprising" used in the present specification mean that the cited component, step, operation, and/or element does not exclude the presence or addition of one or more of other components, steps, operations, and/or elements.

Hereinafter, the present disclosure will be described in detail with reference to the accompanying drawings.

As illustrated in FIG. 1, a mount bush 800 includes an internal pipe 810, a main rubber 820, and an external pipe 830. Additionally, in case of a bush-type hydraulic mount or a mount designed to increase axial characteristics, a middle pipe 840 may be disposed in the mount bush. When the middle pipe 840 exists, it is difficult to perform swaging operation which causes a problem in durability of the mount.

Figure 2A:
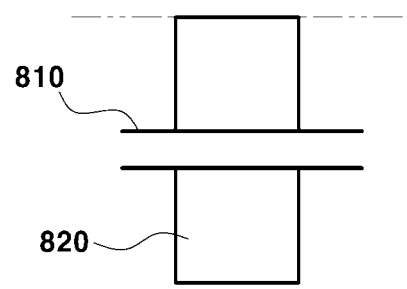
FIG. 2A, FIG. 2B and FIG. 2C illustrate a swaging process performed on a mount bush without a middle pipe.
Figure 2B:
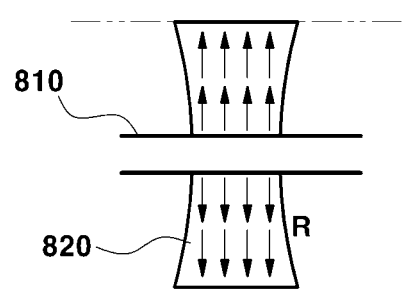
Figure 2C:
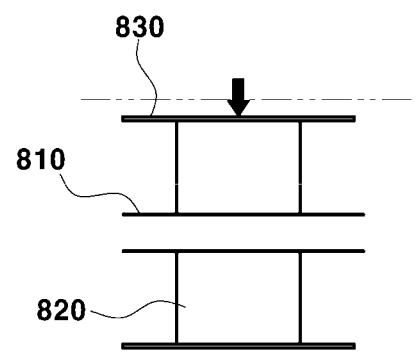

Referring to FIG. 2A, FIG. 2B and FIG. 2C, the mount bush 800 undergoes a swaging (pipe reduction) operation. The main rubber 820 is cooled at room temperature after going through a curing process in which the main rubber 820 is molded at a high temperature in a mold (FIG. 2A). In the present process, the rubber shrinks (FIG. 2B), and generally, the amount of shrinkage of rubber is much greater than that of general metal. As the main rubber 820 shrinks, residual stress R that causes the internal pipe 810 and the external pipe 830 to pull against each other is generated. Due to the residual stress R, the rubber becomes easy to break when stretched. For the present reason, as illustrated in FIG. 2C, swaging is performed on the external pipe 830 to reduce the external diameter of the mount bush, eliminating residual stress and improving durability of the main rubber 820.

Figure 3A:
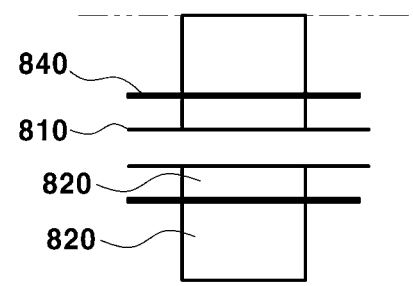
FIG. 3A, FIG. 3B and FIG. 3C illustrate a swaging process performed on a mount bush including a middle pipe.
Figure 3B:
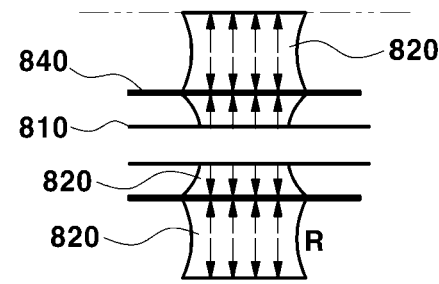
Figure 3C:
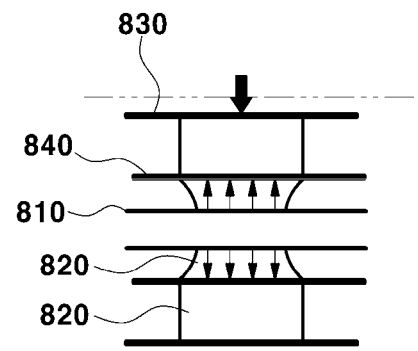

However, referring to FIG. 3A, FIG. 3B and FIG. 3C, when the middle pipe 840 is present, pipe reduction cannot be performed. As illustrated in FIG. 3A, the main rubber 820 is vulcanized at a temperature of about 130 degrees Celsius. Furthermore, as illustrated in FIG. 3B, the main rubber 820 is cooled to about 25 degrees Celsius. At the instant time, the damper shrinks, and residual stress R is generated inside the main rubber 820. Unlike the case of FIG. 2C, even when the swaging operation is performed, no shrinkage is made inside the middle pipe 840 (FIG. 3C).

Figure 4:
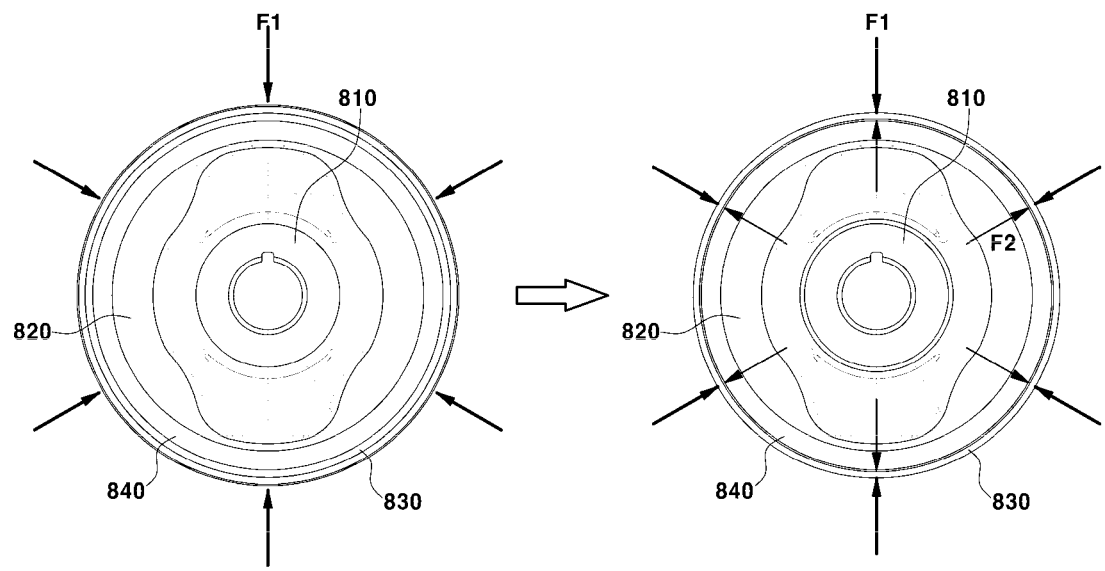
FIG. 4 illustrates a swaging process performed on a mount bush including a middle pipe.

Referring to FIG. 4, even when external force F1 is applied radially inwards to reduce the external pipe 830, the force is not evenly transmitted to the middle pipe 840 located in the middle. As a result, the middle pipe 840 may be bent or twisted and protrude outwards. Furthermore, because the middle pipe 840 made of metal has a counterforce F2 against the external force F1, the rubber inside the middle pipe 840 does not change, failing to obtain the effect of improving durability. As a result, when the main rubber 820 is cooled, residual stress is generated by the contraction of the damper, resulting in reduced durability.

Various aspects of the present disclosure are directed to providing a mount bush that can solve the above mentioned problems. The mount bush according to an exemplary embodiment of the present disclosure enables reduction of the middle pipe.

Figure 5:
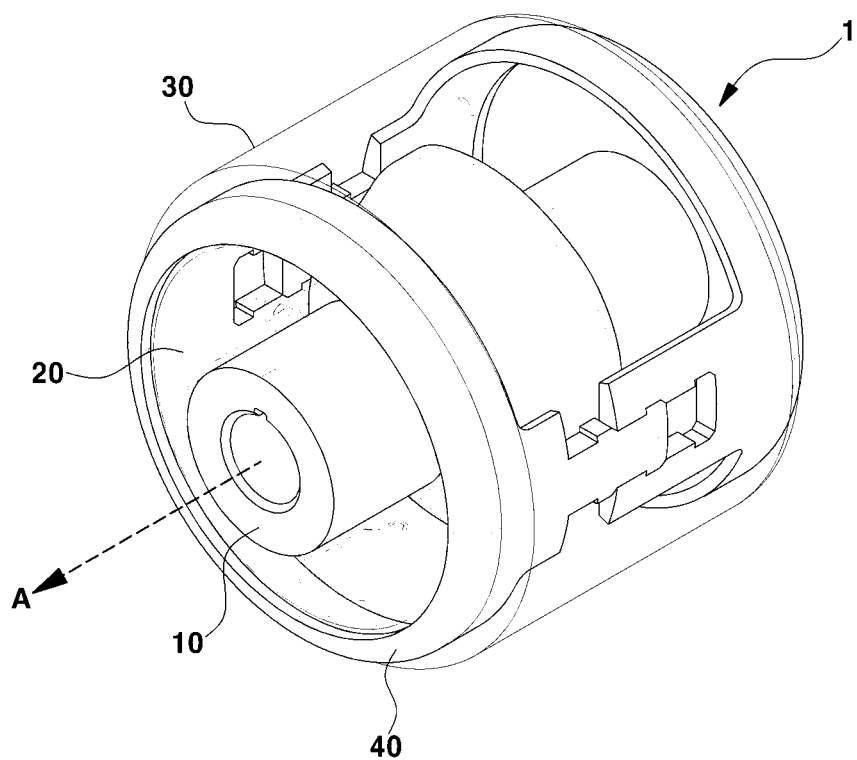
FIG. 5 illustrates a mount bush according to an exemplary embodiment of the present disclosure.

Referring to FIG. 5, according to an exemplary embodiment of the present disclosure, a mount bush 1 includes an internal pipe 10, a main rubber 20, and an external pipe 30.

The internal pipe 10 may connect a motor or a PE module to a vehicle body. The internal pipe 10 may include a tube shape having formed therein a hollow and may be made of metal. The internal pipe 10 may connect the PE module to the vehicle body using a fastening member, such as a bolt mounted in the hollow.

The main rubber 20 made of rubber is provided on the external circumferential surface of the internal pipe 10. For example, the main rubber 20 may be vulcanized on the external circumferential surface of the internal pipe 10.

The external pipe 30 is fitted onto the external side of the main rubber 20. As described above, the external pipe 30 undergoes swaging.

The middle pipe 40 is disposed between the internal pipe 10 and the external pipe 30 and is disposed inside the main rubber 20. The middle pipe 40 is surrounded by the main rubber 20 and may be made of metal.

Figure 6:
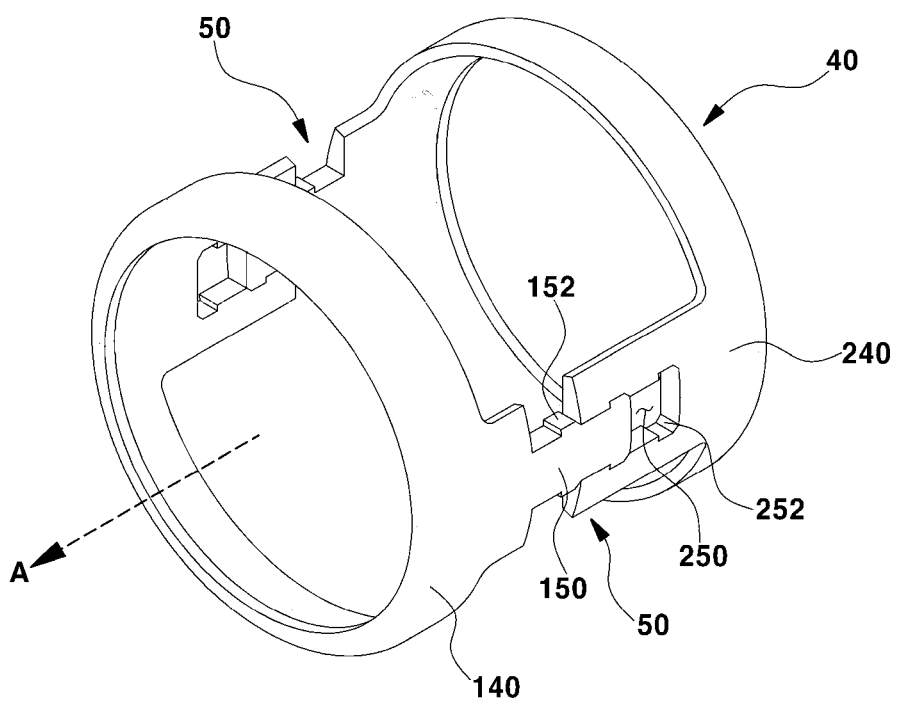
FIG. 6 illustrates a middle pipe for a mount bush according to an exemplary embodiment of the present disclosure.

Referring to FIG. 6, the middle pipe 40 according to an exemplary embodiment of the present disclosure includes a length variable in an axial direction A thereof. In other words, the middle pipe 40 may be swaged in the axial direction A. To the present end, according to various exemplary embodiments of the present disclosure, the middle pipe 40 includes a first middle pipe 140 and a second middle pipe 240.

The first middle pipe 140 is disposed at one side of the mount bush 1, and the second middle pipe 240 is disposed at the other side of the mount bush 1.

The first middle pipe 140 and the second middle pipe 240 include a connection structure 50 configured to connect the first middle pipe 140 and the second middle pipe 240 to each other. In an exemplary embodiment of the present disclosure, the connection structure 50 includes one or more coupling protrusions 150 and one or more guides 250. The coupling protrusion 150 extends in the axial direction of the middle pipe 40 and is engaged with the guide 250. The coupling protrusion 150 and the guide 250 may move relative to each other. In an exemplary embodiment of the present disclosure, the first middle pipe 140 and the second middle pipe 240 each may include one or more coupling protrusions 150 and one or more guides 250. The first middle pipe 140 may include the coupling protrusion 150 at one side of the first middle pipe 140 and may include the guide 250 at the other side of the first middle pipe 140. Furthermore, the second middle pipe 240 may include the coupling protrusion 150 at one side of the second middle pipe 240 and may include the guide 250 at the other side of the second middle pipe 240. Accordingly, the coupling protrusion 150 of the first middle pipe 140 is engaged with the guide 250 of the second middle pipe 240, and the guide 250 of the first middle pipe 140 is engaged with the coupling protrusion 150 of the second middle pipe 240. Accordingly, the first middle pipe 140 and the second middle pipe 240 may be identical in shape. Because the middle pipe 40 is fabricated by assembling two structures including the same shape, cost may be reduced.

However, in various exemplary embodiments of the present disclosure, the first middle pipe 140 may include a pair of coupling protrusions 150 spaced from each other, and the second middle pipe 240 may include a pair of guides 250 spaced from each other.

Figure 7B:
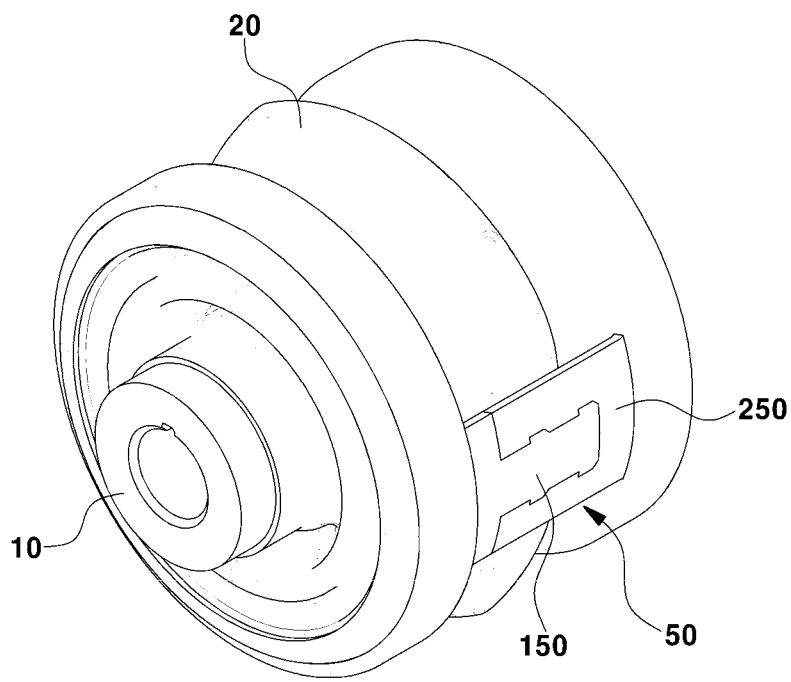

As illustrated in FIG. 7A and FIG. 7B, for example, the connection structure 50 includes a first position P1 and a second position P2. The coupling protrusion 150 may be partially engaged with the guide 250 in the first position P1 of the connection structure 50. The coupling protrusion 150 may be completely engaged with the guide 250 in the second position P2 of the connection structure 50. In other words, the axial length of the middle pipe 40 in the first position P1 is greater than the axial length of the middle pipe 40 in the second position P2.

According to various exemplary embodiments of the present disclosure, the coupling protrusion 150 includes one or more protrusions 152 and the guide 250 includes one or more engaging portions 252 so that the connection structure 50 may be at each of the positions P1 and P2. In various exemplary embodiments of the present disclosure, two protrusions 152 may be provided, which is spaced apart in the longitudinal direction of the coupling protrusion 150. Likewise, the number of engaging portions 252 formed in the guide 250 may correspond to the number of protrusions 152. In various exemplary embodiments of the present disclosure, the protrusions 152 may laterally protrude from opposite sides of the coupling protrusion 150, respectively, and the guide 250 may have formed therein the engaging portions 252, the number thereof corresponding to the number of the protrusions 152, at positions corresponding to the protrusions 152.

Figure 8A:
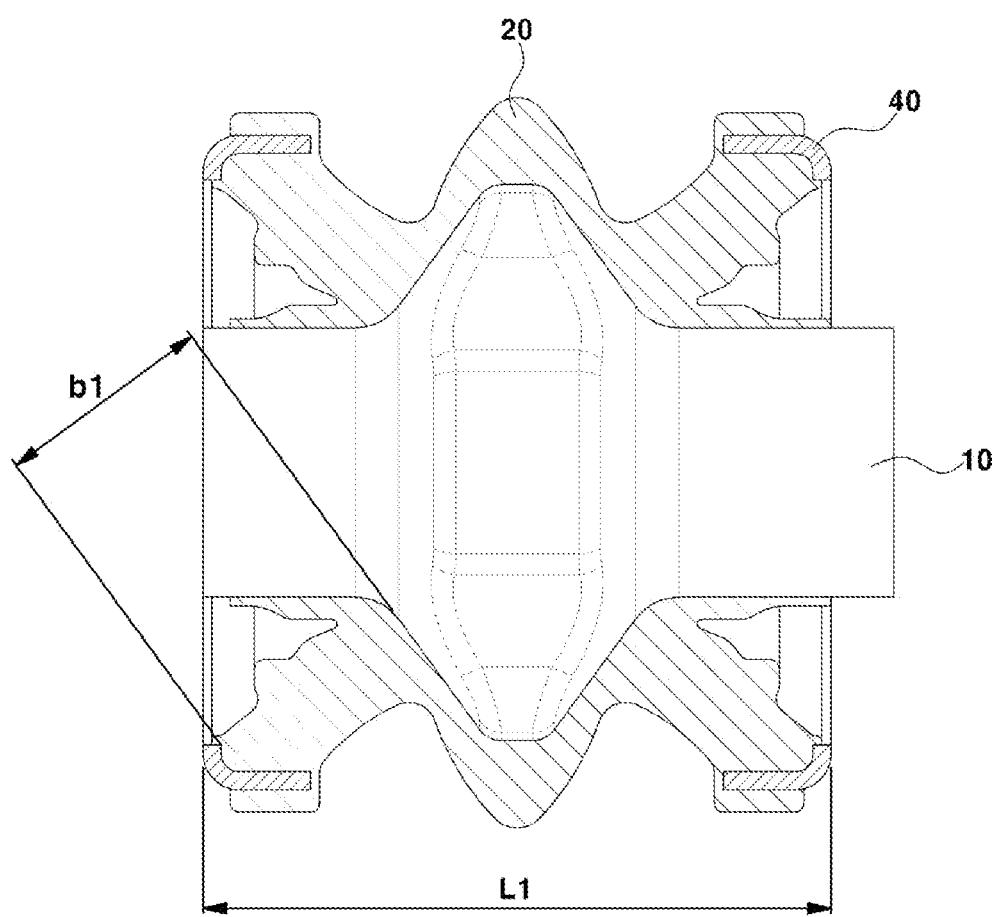
FIG. 8A and FIG. 8B illustrate cutaway views of a mount bush according to an exemplary embodiment of the present disclosure.
Figure 8B:
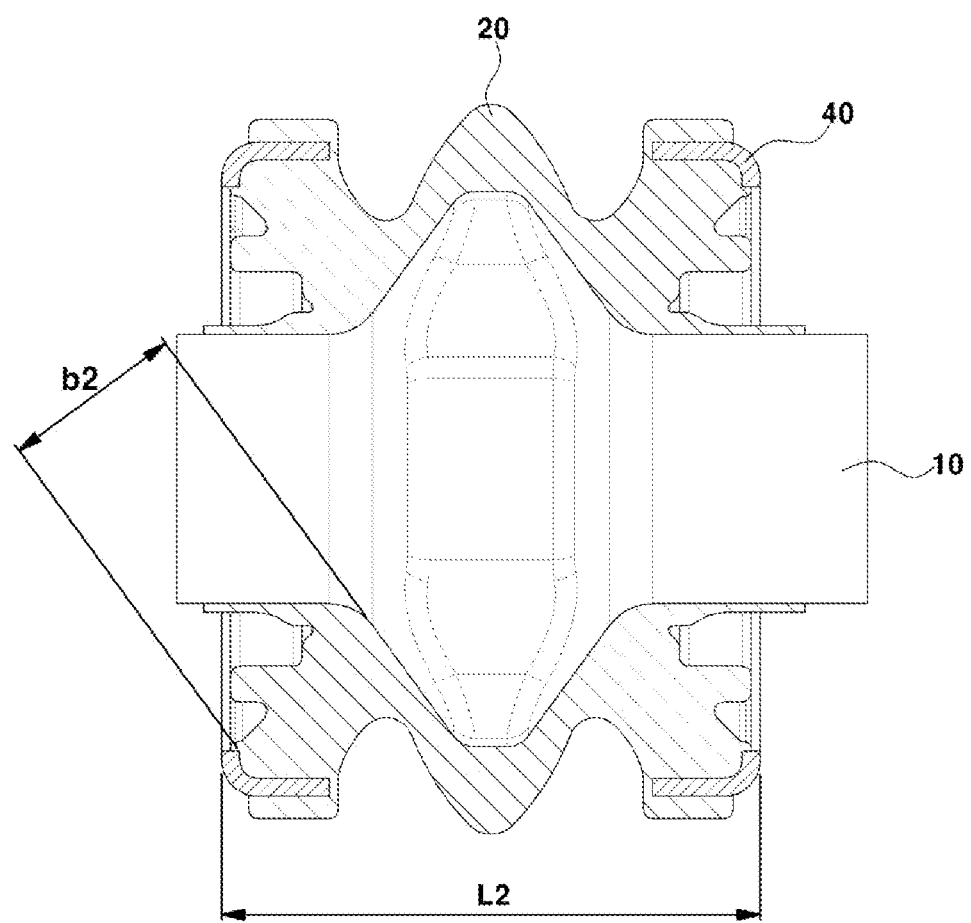

According to an exemplary embodiment of the present disclosure, as illustrated in FIG. 7A, when an axial force F3 is applied inwards to the middle pipe 40 in the first position P1, the coupling protrusion 150 is completely engaged with the guide 250. As illustrated in FIG. 7B, when the connection structure 50 is moved to the second position P2, both the axial length of the mount bush 1 (reduced from L1=70 mm to L2=60 mm, see FIGS. 8A and 8B) and a bridge length of the main rubber 20 (reduced from b1=25 mm to b2=21.5 mm) may be reduced. In the instant case, the bridge length b of the main rubber 20 may be reduced, similar to an effect of the radial swaging, releasing internal stress and improving durability.

Figure 9A:
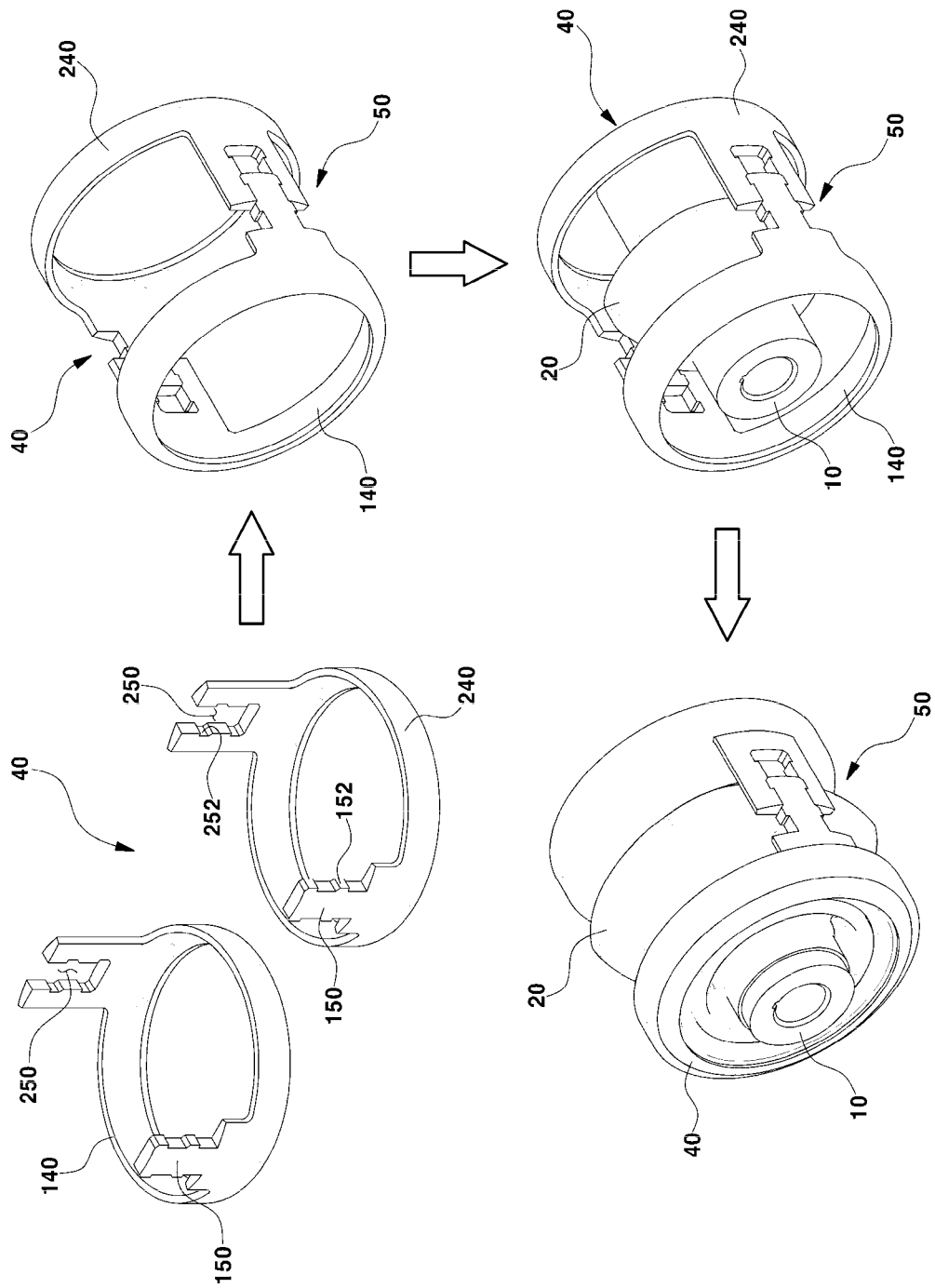
FIG. 9A and FIG. 9B illustrate an assembly process of a mount bush according to an exemplary embodiment of the present disclosure.
Figure 9B:
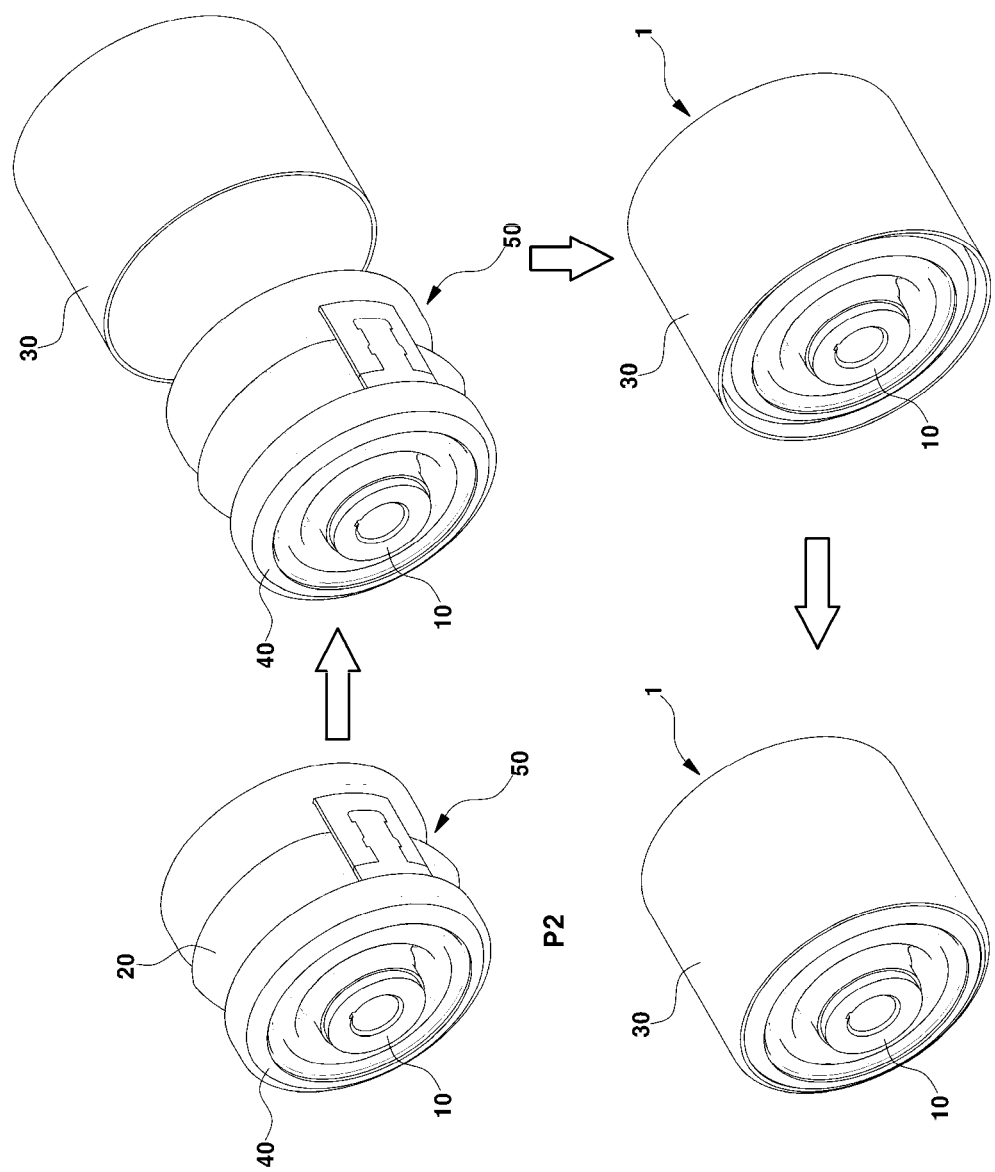

As illustrated in FIG. 9A and FIG. 9B, the mount bush 1 according to an exemplary embodiment of the present disclosure may be assembled as follows.

As illustrated in FIG. 9A, the first middle pipe 140 and the second middle pipe 240 including the identical shape may be assembled to form the middle pipe 40. Because the first middle pipe 140 and the second middle pipe 240 are identical in shape, it may be advantageous in commonality and cost reduction.

The first middle pipe 140 and the second middle pipe 240 are assembled in the following step. First, the first middle pipe 140 and the second middle pipe 240 are assembled so that the connection structure 50 between the first middle pipe 140 and the second middle pipe 240 is positioned in the first position P1. Then the main rubber 20 is vulcanized thereon. Here, if the rubber is vulcanized on the connection structure 50 in the vulcanization process of the main rubber 20, it may hinder shrinkage in the axial direction A. For the present reason, as illustrated in FIG. 10, a mold pin may be inserted into a space S during manufacture of the mount bush 1 to prevent the rubber from being cured on the connection structure 50.

Figure 11A:
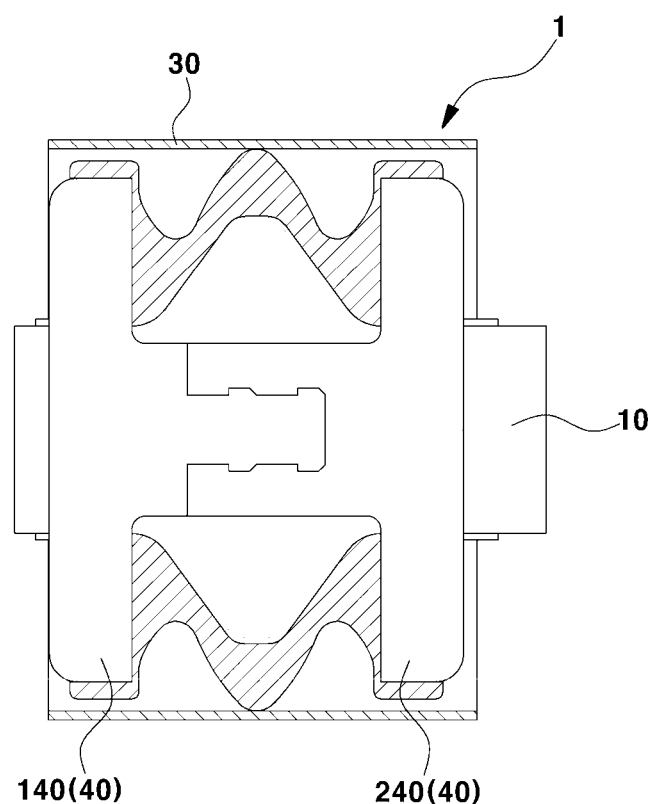
FIG. 11A illustrates a mount bush according to an exemplary embodiment of the present disclosure, which is not curled.

Accordingly, as illustrated in FIG. 9B, the connection structure 50 is positioned in the second position P2 by applying the axial force F3 to the mount bush 1. Thereafter, the main rubber 20 may be inserted into the external pipe 30, and the external pipe 30 may be swaged (see FIG. 11A).

Figure 11B:
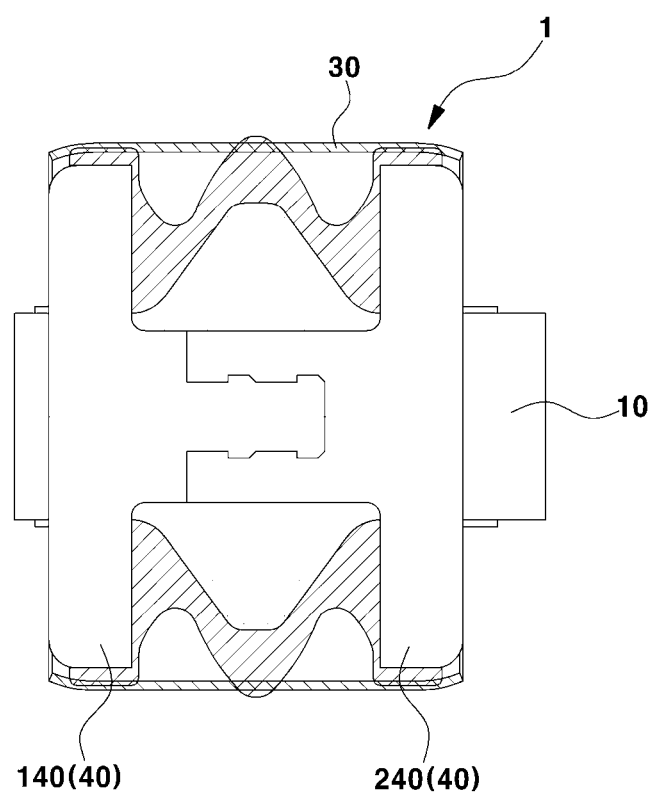
FIG. 11B illustrates a mount bush according to an exemplary embodiment of the present disclosure, which is curled.

According to various exemplary embodiments of the present disclosure, the middle pipe 40 and the external pipe 30 may be curled. The external pipe 30 is curled so that the end portion of the external pipe 30 is curled radially inwards to prevent the middle pipe 40 from escaping outwards (see FIG. 11B).

The middle pipe 40 and the external pipe 30 may be selectively curled. For example, whether to perform curling may be determined depending on the escaping force of the middle pipe 40, which means both the external pipe 30 and the middle pipe 40 may be fabricated to include a flat shape without curling.

According to an exemplary embodiment of the present disclosure, the durability of the mount bush in which the middle pipe should be adopted may be increased.

The mount bush including the middle pipe according to an exemplary embodiment of the present disclosure may greatly contribute to cost and weight reduction.

Although the mount bush according to an exemplary embodiment of the present disclosure has been illustratively referred to as being applied to a motor of an electric vehicle, it is not limited thereto and may be used to mount other portions, such as an engine. For example, the mount bush may be applied where improved lateral drivability is needed.

As is apparent from the above description, various aspects of the present disclosure are directed to providing the following effect.

According to an exemplary embodiment of the present disclosure, a mount bush configured for increasing durability of the mount is provided.

Effects of the present disclosure are not limited to what has been described above, and other effects not mentioned herein will be clearly recognized by those skilled in the art based on the above description.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mount bush comprising:
   an internal pipe;
   a middle pipe disposed outside the internal pipe;
   a main rubber vulcanized between the internal pipe and the middle pipe; and
   an external pipe fitted onto an external side of the main rubber,
   wherein the middle pipe is configured to be variable in a length thereof.

2. The mount bush of claim 1, wherein the middle pipe has the length reducible by an external force applied axially inwards thereto.

3. The mount bush of claim 1, wherein the middle pipe includes:
   a first middle pipe;
   a second middle pipe connected to the first middle pipe; and
   a connection structure configured to enable relative motion of the first middle pipe and the second middle pipe therebetween.

4. The mount bush of claim 3, wherein the connection structure is provided on each of the first middle pipe and the second middle pipe.

5. The mount bush of claim 4, wherein the first middle pipe and the second middle pipe are identical in shape.

6. The mount bush of claim 3, wherein the connection structure includes:
   at least one coupling protrusion formed on one of the first middle pipe and the second middle pipe and protruding in an axial direction of the mount bush; and
   at least one guide formed in another one of the first middle pipe and the second middle pipe and engaged with the at least one coupling protrusion.

7. The mount bush of claim 6,
   wherein each coupling protrusion includes at least one protruding portion laterally protruding from the at least one coupling protrusion, and
   wherein each guide includes at least one engaging portion recessed to be engaged with the at least one protruding portion.

8. The mount bush of claim 7,
   wherein the at least protruding portion includes:
   a first protruding portion; and
   a second protruding portion disposed closer to an end portion of the at least one coupling protrusion than the first protruding portion, and
   wherein the guide includes:
   a first engaging portion; and
   a second engaging portion disposed closer to an end portion of the guide than the first engaging portion.

9. The mount bush of claim 7, wherein at a first position, the second protruding portion is engaged to the second engaging portion and the first protruding portion is disengaged to the first engaging portion.

10. The mount bush of claim 7, wherein at a second position, the second protruding portion is engaged to the second engaging portion and the first protruding portion is engaged to the first engaging portion.

11. The mount bush of claim 6, wherein the connection structure includes:
    a first position where the at least one coupling protrusion is partially engaged with the at least guide; and
    a second position where the at least one coupling protrusion is completely engaged with the at least guide, and
    wherein the middle pipe in the second position has a smaller length than in the first position.

12. The mount bush of claim 3, wherein the connection structure includes:
    a first coupling protrusion protruding in an axial direction of the mount bush from the first middle pipe; and
    a first guide formed in the second middle pipe and engaged with the first coupling protrusion.

13. The mount bush of claim 12, wherein the connection structure further includes:

a second guide formed in the first middle pipe and being spaced from the first coupling protrusion with a predetermined distance; and a second coupling protrusion formed on the second middle pipe and being spaced from the first guide with a predetermined distance.

14. A method of manufacturing a mount bush, the method comprising:
assembling a middle pipe including a first middle pipe and a second middle pipe into a first position;
disposing an internal pipe inside the middle pipe;
vulcanizing a main rubber between the internal pipe and the middle pipe; and
applying an axial force to the middle pipe where the main rubber is cured to move the middle pipe to a second position.

15. The method of claim 14, further including, after applying the axial force, fitting an external pipe onto an external side of the mount bush and swaging the external pipe.

16. The method of claim 15, further including curling the external pipe.

17. The method of claim 14, wherein the middle pipe in the second position has a smaller length than in the first position.

18. The method of claim 14, wherein the middle pipe further includes
a connection structure configured to enable relative motion of the first middle pipe and the second middle pipe therebetween.

19. The method of claim 14, wherein the first middle pipe and the second middle pipe are identical in shape.

* * * * *